United States Patent
Gherman et al.

(10) Patent No.: US 11,111,973 B2
(45) Date of Patent: Sep. 7, 2021

(54) DRIVE MECHANISM

(71) Applicant: STABILUS GMBH, Koblenz (DE)

(72) Inventors: Madalina Gherman, Brasov (RO); Mihai-Augustin Vidrean, Sighisoara (RO); Sergei Mazepa, Kaisersesch (DE); Magnus Hümmerich, Dierdorf (DE)

(73) Assignee: STABILUS GMBH, Koblenz (DE)

( * ) Notice: Subject to any disclaimer, the term of this patent is extended or adjusted under 35 U.S.C. 154(b) by 0 days.

(21) Appl. No.: 16/523,076

(22) Filed: Jul. 26, 2019

(65) Prior Publication Data
US 2020/0032865 A1 Jan. 30, 2020

(30) Foreign Application Priority Data
Jul. 27, 2018 (DE) ...................... 10 2018 118 299.6

(51) Int. Cl.
*H02K 11/215* (2016.01)
*F16D 7/02* (2006.01)
(Continued)

(52) U.S. Cl.
CPC .......... *F16D 55/226* (2013.01); *F16D 65/186* (2013.01); *F16D 2121/26* (2013.01); *F16D 2200/0034* (2013.01)

(58) Field of Classification Search
CPC .......... F16D 7/022; F16D 7/024; F16D 55/22; F16D 55/226; F16D 65/18; F16D 65/186; H02K 11/215; H02K 7/003
(Continued)

(56) References Cited

U.S. PATENT DOCUMENTS 9,021,905 B2   5/2015  Reif
10,487,898 B2* 11/2019 Ritter ...................... F16D 67/00
(Continued)

FOREIGN PATENT DOCUMENTS

CN    101437712 A   5/2009
CN    103661315 A   3/2014
(Continued)

OTHER PUBLICATIONS

Japanese Office Action Summary, JP Appln No. 2019-133782, dated Sep. 1, 2020, 1 pg.
(Continued)

*Primary Examiner* — Christopher P Schwartz
(74) *Attorney, Agent, or Firm* — Lucas & Mercanti, LLP

(57) ABSTRACT

A drive mechanism having a drive motor that rotatably drives a threaded spindle against a specific braking force generated by a pretensioned spring of a friction brake arrangement. The drive motor and the threaded spindle are arranged coaxially in a housing tube of the drive mechanism, and components of the friction brake arrangement are arranged in a tubular brake housing, which is arranged in an axially and rotationally fixed in the housing tube. A first end of the brake housing has one or more radially inwardly directed first stop shoulders and at a second end of the brake housing has one or more radially inwardly directed second stop shoulders. The brake housing has at its first end a radially circumferential ring with one or more radially resilient spring arms extending axially toward the second end, at the free ends of which spring arms are arranged the second stop shoulders.

10 Claims, 5 Drawing Sheets

(51) Int. Cl.
*F16D 55/226* (2006.01)
*F16D 65/18* (2006.01)
*F16D 121/26* (2012.01)

(58) Field of Classification Search
USPC ....... 49/280; 74/89, 89.23, 424.71; 188/110, 188/130, 134, 173, 300
See application file for complete search history.

(56) References Cited

U.S. PATENT DOCUMENTS

| | | | |
|---|---|---|---|
| 2008/0060273 A1* | 3/2008 | Boehen | H02K 7/06 49/340 |
| 2009/0247365 A1 | 10/2009 | Di Stefano | |
| 2014/0069751 A1 | 3/2014 | Park | |
| 2015/0053510 A1 | 2/2015 | Suzuki | |
| 2015/0263593 A1* | 9/2015 | Wallner | H02K 3/28 310/71 |
| 2015/0300468 A1* | 10/2015 | Ritter | F16H 25/2454 74/89.39 |
| 2016/0297266 A1 | 10/2016 | Hinz | |
| 2016/0333951 A1 | 11/2016 | Lee | |
| 2017/0155308 A1* | 6/2017 | Reifenhauser | H02K 7/003 |

FOREIGN PATENT DOCUMENTS

| | | |
|---|---|---|
| CN | 104169607 A | 11/2014 |
| CN | 106151326 A | 11/2016 |
| CN | 106849473 A | 6/2017 |
| DE | 102010019344 B3 | 5/2011 |
| EP | 0647799 A2 | 4/1995 |
| JP | H07174204 A | 7/1995 |
| JP | 2001082569 A | 3/2001 |
| JP | 2002345206 A | 11/2002 |
| JP | 2013242030 A | 12/2013 |
| JP | 2016504536 A | 2/2016 |
| JP | 2017187127 A | 10/2017 |

OTHER PUBLICATIONS

China Search Report, CN 2019106832305, dated Sep. 18, 2020, 4 pgs.

* cited by examiner

DRIVE MECHANISM

CROSS-REFERENCE TO RELATED APPLICATIONS

The present application claims priority to DE 10 2018 118 299.6, filed on Jul. 27, 2018, the entire contents of which are incorporated herein by reference.

BACKGROUND OF THE INVENTION

The invention relates to a drive mechanism having a drive motor with a drive shaft that directly or indirectly rotatably drives a threaded spindle to surmount a braking force generated by a pretensioned spring in a friction brake arrangement, the drive motor and the threaded spindle being arranged coaxially in a housing tube, and the components of the friction brake arrangement are arranged in a tubular brake housing, which is arranged in an axially fixed and rotationally secure manner in the housing tube and which has at its first end one or more radially inwardly directed first stop shoulders and at its second end one or more radially inwardly directed second stop shoulders.

In a drive mechanism of this type, it is known that the first stop shoulders and/or the second stop shoulders are formed by plastically bent, lug-like protrusions on a first end and/or a second end of the metal brake housing. For assembly of the prior art drive mechanism, the components of the friction brake arrangement are inserted into the brake housing, and the lug-like protrusions are then plastically bent over in a radially inwardly directed form so that the friction brake arrangement forms a preassembled unit that can be inserted in the drive mechanism to thereby simplify the assembly of the drive mechanism.

In order to keep the braking force constant over the life of the drive mechanism, the components of the friction brake arrangement must also be kept in the same position over the life of the drive mechanism.

The bent-over, lug-like protrusions have the drawback, however, that in the course of time they can bend back somewhat under the permanent application of force by the pretensioned spring, which leads to a change in the positions of the components of the friction brake arrangement, and thus to a reduction of the braking force and hence a lowering of the extended threaded spindle.

BRIEF SUMMARY OF THE INVENTION

An object of the invention is therefore to provide a drive mechanism of the type stated in the introduction, which is easy to assemble and in which the braking force of the friction brake arrangement is as far as possible kept constant over the lifetime of the drive mechanism.

The object is achieved by a drive mechanism with a housing tube, a drive motor, a threaded spindle, and a friction brake arrangement with a brake housing that includes a radially circumferential ring and first stop shoulders formed at a first axial end of the brake housing, one or more radially resilient spring arms that extend axially from the circumferential ring toward a second axial end of the brake housing, and second stop shoulders arranged at the free ends of spring arms.

As a result of this configuration, the components of the friction brake arrangement can be inserted, under radially resilient expansion of the spring arms, into the brake housing, which, by spring-back of the spring arms into their axial original position, keeps all components in the brake housing chambered and forms a preassembled structural unit.

After the brake housing of the friction brake unit is introduced into the housing tube, the spring arms, and hence also the second stop shoulders, are then obstructed by the housing tube from radial deflection in the outward direction, and thus the second stop shoulders are held permanently in their position. Therefore, the braking force of the friction brake arrangement remains as far as possible constant over the lifetime of the drive mechanism.

In a preferred embodiment, the brake housing is configured as a single piece with the radially circumferential ring, the spring arms and the second stop shoulders.

For the easy plug-in assembly of the components of the friction brake arrangement, the plurality of spring arms are configured to be evenly distributed on the periphery of the brake housing at a radial distance apart.

If the second stop shoulders are configured as latching hooks with inner sides facing toward the interior of the brake housing that extend radially, and with outer sides facing away from the interior of the brake housing that are inclined from radially out to in relative to the interior of the brake housing, then lead-in ramps are formed, as a result of which, upon the introduction of the components into the brake housing, the spring arms automatically pivot radially outward so as then, after passing the second stop shoulders, to pivot back into their axial starting position.

The configuration of the second stop shoulders as latching hooks has the further advantage that, by virtue of this shaping, bending-up of the second stop shoulders during use is particularly well avoided.

In an easy to assemble embodiment of the friction brake arrangement, a pretensioned compression spring arrangement is axially supported against the first stop shoulders. The compression spring arrangement, via a first thrust washer, acts axially on a brake disk, which in turn, via a second thrust washer, is axially supported against the second stop shoulders, wherein the axially displaceable thrust washers are connected in a rotationally secure manner to the brake housing and the axially displaceable brake disk is connected in a rotationally secure manner to the threaded spindle.

Instead of one brake disk arranged between two thrust washers, a plurality of brake disks arranged between thrust washers can also be present.

In one embodiment, the rotationally secure connection of the thrust washers to the brake housing is formed by protrusions which protrude radially on the outer periphery of the thrust washers and which project into axially extending clearances between the spring arms of the brake housing.

The rotationally secure connection of the brake disk to the threaded spindle can be formed by a serration on the threaded spindle, on which the brake disk having a central recess of appropriate contour is disposed with a sliding fit.

For the positioning of the friction brake arrangement in an axial direction in the housing tube, the brake housing is axially supported with its first end directly or indirectly against a back-up ring that is arranged in an axially fixed manner in the housing tube according to an embodiment of the present invention.

For the positioning of the friction brake arrangement in the other axial direction in the housing tube, the brake housing is axially supported with its second end directly or indirectly against a guide bushing arranged in an axially fixed manner in the housing tube according to an embodiment of the present invention.

In one embodiment, the drive shaft is coupled via a flexible coupling to the threaded spindle.

For the mounting of the threaded spindle close to its end proximate to the drive shaft, the threaded spindle is rotatably mounted by a roller bearing arranged between the brake housing and the flexible coupling.

In one embodiment, the brake housing consists of a dimensionally stable plastic, which allows the brake housing to be manufactured in a cost-effective manner in one piece.

BRIEF DESCRIPTION OF THE DRAWINGS

Illustrative examples of the invention are represented in the drawing and are described in closer detail below, wherein.

DETAILED DESCRIPTION OF THE PREFERRED EMBODIMENTS

Figure 1:
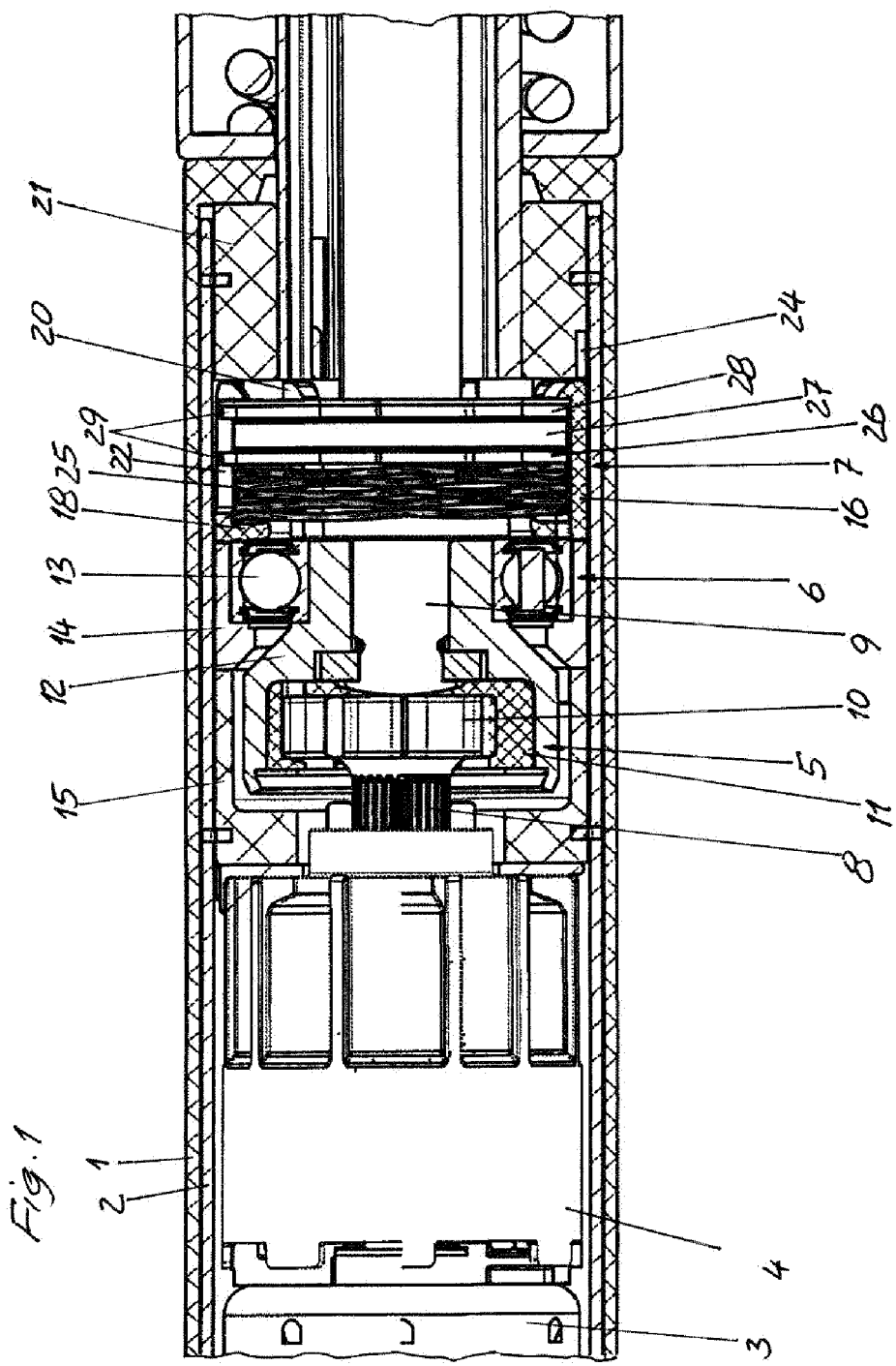
FIG. 1 is a longitudinal sectional view of a detail of a drive mechanism according to an embodiment of the present invention.
Figure 2:
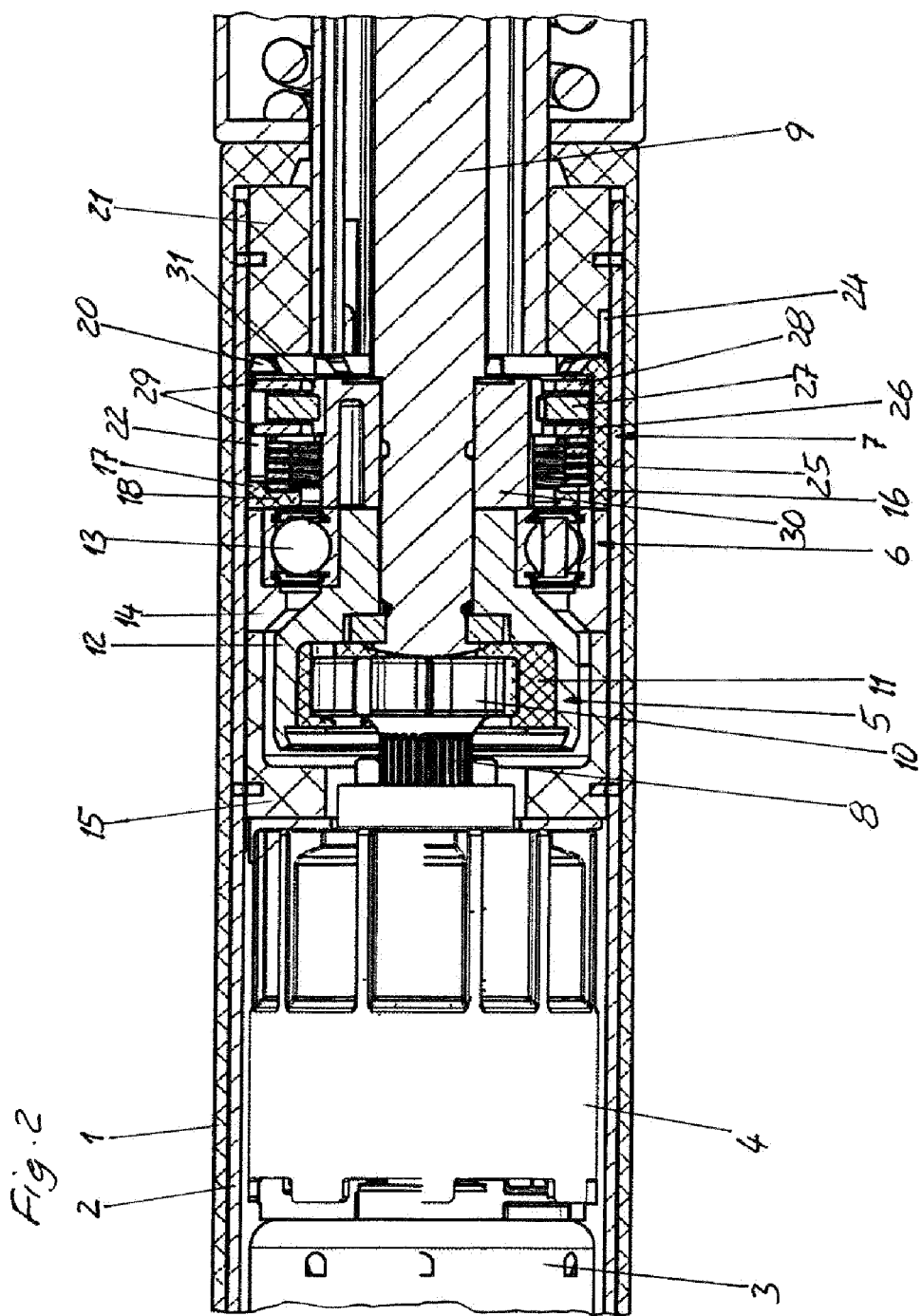
FIG. 2 is a further longitudinal sectional view showing a further detail of the drive mechanism according to FIG. 1.

The drive mechanism represented in the Figures has a tubular drive housing 1, in which a housing tube 2 is inserted.

In the housing tube 2, a drive motor 3 configured as an electric motor, a gear mechanism 4, a coupling 5, a bearing unit 6 and a friction brake arrangement 7 are arranged axially one behind another.

A threaded spindle 9 is rotatably driven by a drive shaft 8 of the drive motor 3 via the gear mechanism 4 and via the coupling 5.

The coupling 5 is a flexible coupling, in which the radially widened end 10 of the drive shaft is connected, via an elastomer ring 11 radially enclosing the end 10, to a sleeve member 12 fixedly arranged on the threaded spindle 9.

A first back-up ring 14 is inserted in the housing tube 2. An axial end of the first back-up ring 14 toward the drive motor 3 is axially supported against a second back-up ring 15, which in turn is connected in an axially and radially fixed manner to the housing tube 2. The sleeve member 12, and with it the threaded spindle 9, are in turn rotatably mounted, via a roller bearing 13 configured as a radial ball bearing, on the first back-up ring 14.

A tubular brake housing 16 of the friction brake arrangement 7 is axially supported against an end face of the first back-up ring 14 that faces away from the drive motor 3. The tubular brake housing 16 is formed of a plastic and inserted into the housing tube 2.

The brake housing 16 has, on a first end facing toward the drive motor 3, a radially circumferential ring 17, at the free end of which are arranged lug-like, radially inwardly directed first stop shoulders 18.

Figure 7:
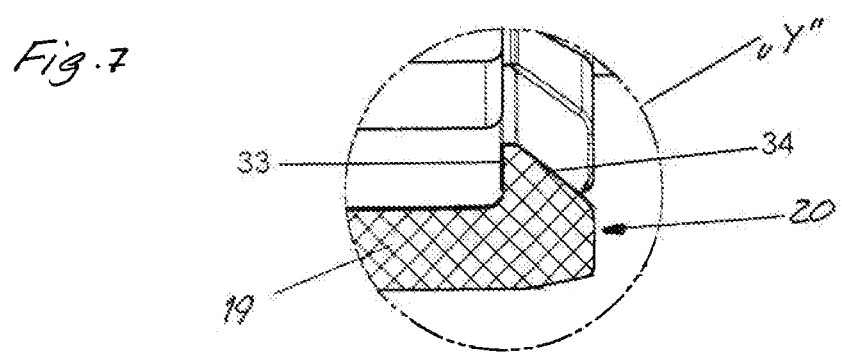
FIG. 7 shows an enlarged detail "Y" from FIG. 6.
Figure 8:
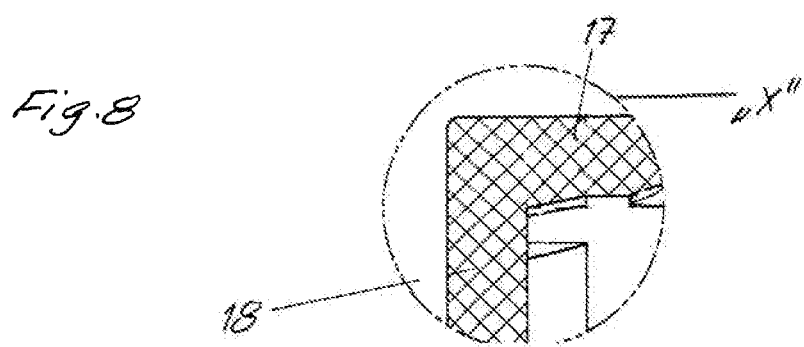
FIG. 8 shows an enlarged detail "X" from FIG. 6.

From the ring 17, a plurality of radially resilient spring arms 19 extend, distributed on the periphery, toward a second end of the brake housing 16 further remote from the drive motor 3. Latching hooks 20 are arranged at the free ends of the spring arms 19. Inner sides 33 of the latching hooks 20 form radially inwardly directed second stop shoulders and the outer sides 34 of the latching hooks 20 facing away from the interior of the brake housing 16, form ramps that that are inclined from radially out to radially in from the axial free end toward the interior of the brake housing 16 (see FIG. 7). When the ramps of the latching hooks 20 are axially impinged by those components of the friction brake arrangement which are to be inserted, the spring arms 19 are deflected radially outward.

The sides of the latching hooks 20 that are closer to the interior of the brake housing 18 extend radially inward, thereby forming the second stop shoulders.

The axial sides of the latching hooks 20 facing away from the interior of the brake housing 16 are axially supported against a guide bushing 21 inserted into the housing tube 2 and connected in an axially and radially fixed manner to the housing tube 2.

Figure 5:
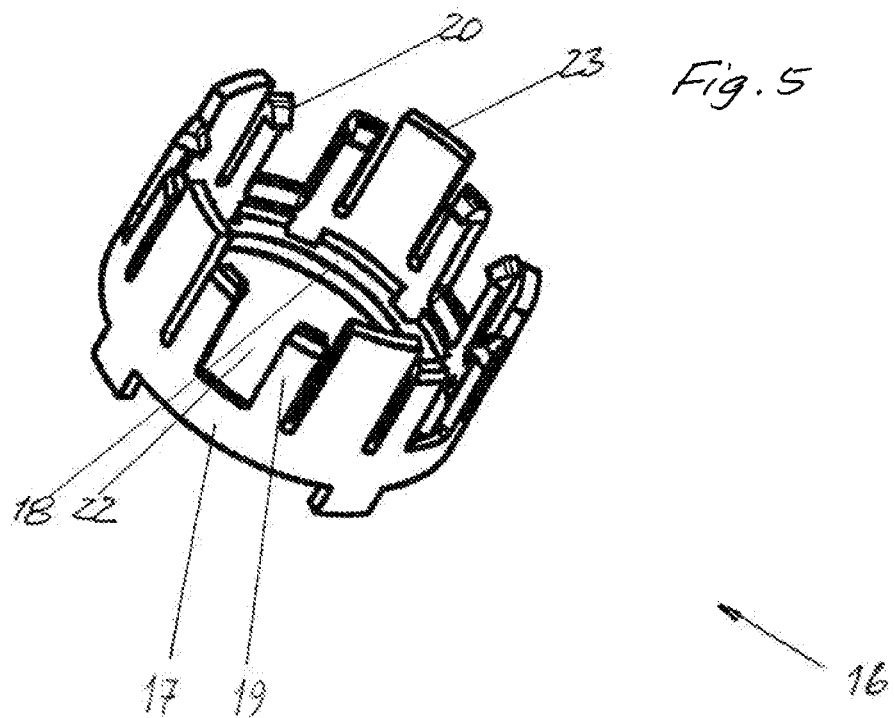
FIG. 5 is a perspective view of the brake housing according to FIG. 4.
Figure 6:
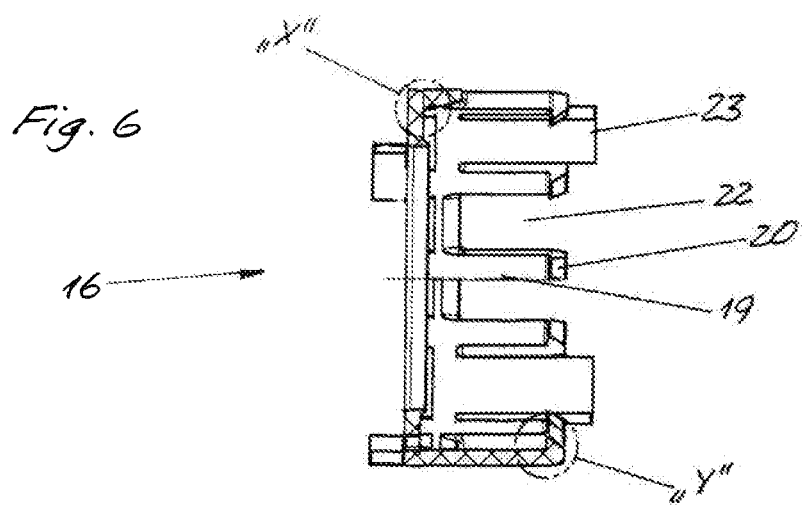
FIG. 6 is a longitudinal sectional view of the brake housing according to FIG. 4.

As shown in FIG. 5, axially extending clearances 22 and anti-twist arms 23 are alternately formed between successive adjacent pairs of spring arms in a circumferential direction.

The anti-twist arms 23 project with their free ends into appropriate recesses 24 in the guide bushing 21, so that the brake housing 16 is prevented from twisting in the housing tube 2.

The brake housing 16 is axially fixed in the housing tube 2 by the arrangement of the brake housing 16 between the first back-up ring 14 and the guide bushing 21.

A pretensioned annular compression spring arrangement 25 is arranged in the brake housing 16. The compression spring arrangement 25 is axially supported against the first stop shoulders 18 and axially impinges on a first thrust washer 26.

On that side that is facing away from the compression spring arrangement 25, the first thrust washer 26 bears axially against one side of a brake disk 27, the other side of which is borne against by a second thrust washer 28, which in turn are axially supported against those sides of the latching hooks 20 which lie closer to the interior of the brake housing 18.

Figure 3:
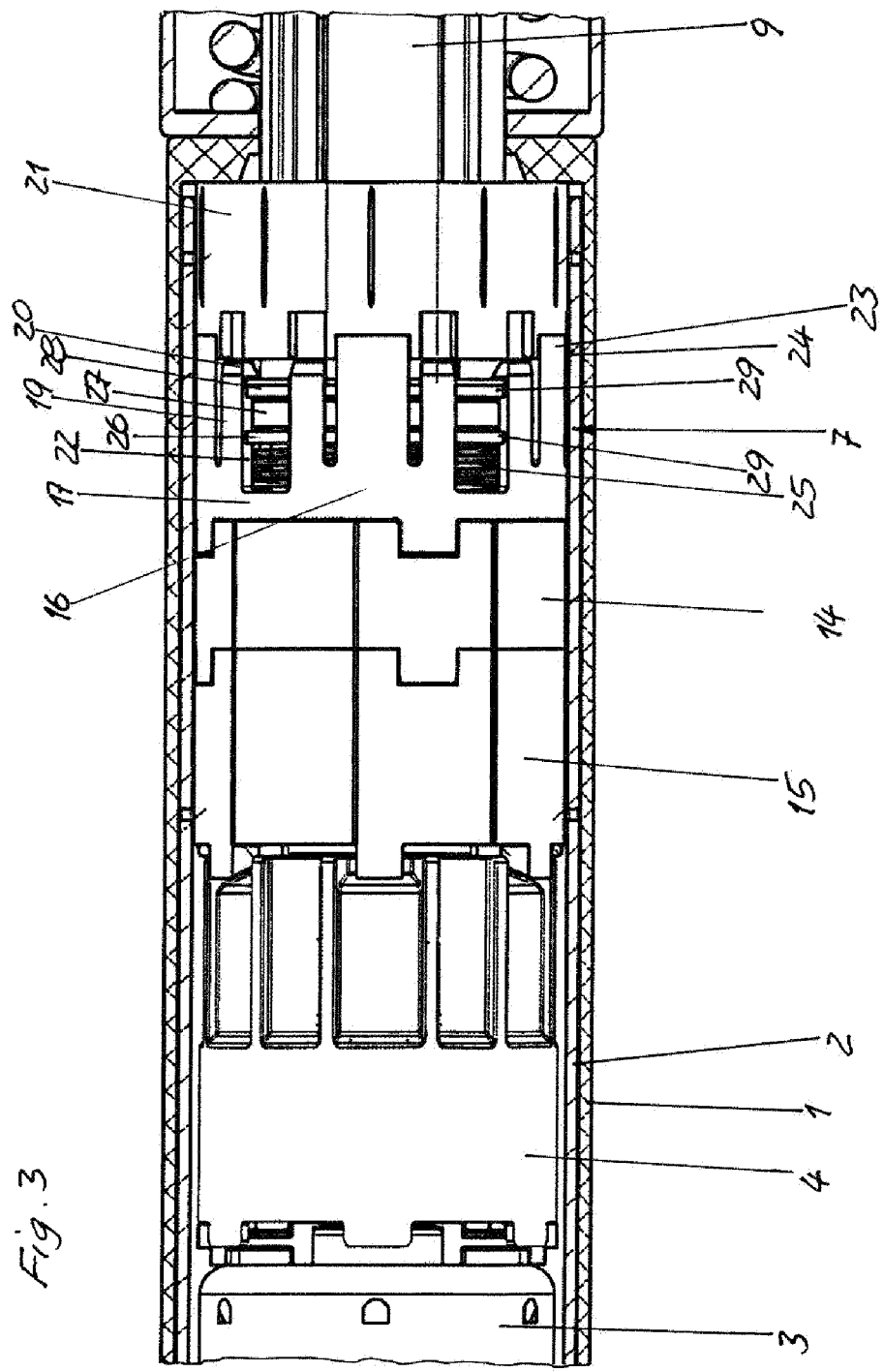
FIG. 3 is a third longitudinal sectional view showing an additional detail of the drive mechanism according to FIG. 1.
Figure 4:
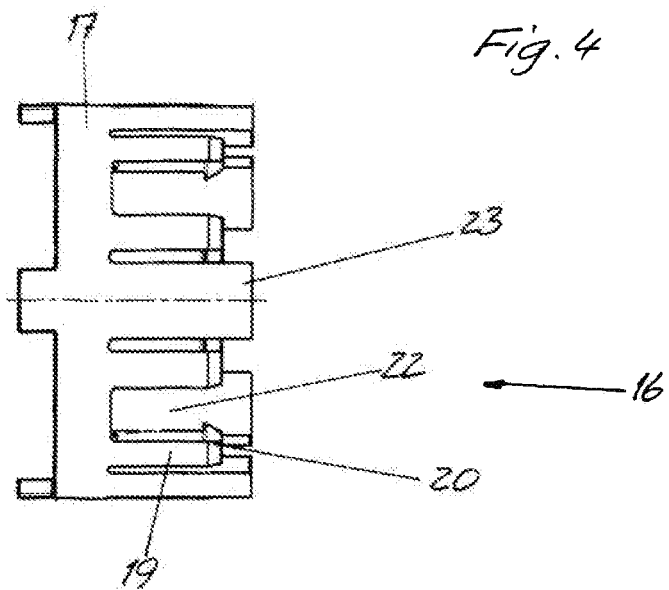
FIG. 4 is a side view of a brake housing of the drive mechanism according to FIG. 1.

In the regions of the clearances 22 between the spring arms 19, the first thrust washer 26 and the second thrust washer 28 have protrusions 29, which project radially outward into these clearances 22 and by which the thrust washers 26 and 28 are held in a rotationally secure manner (see FIG. 3). In the clearances 22, the protrusions 29, and hence also the thrust washers 26 and 28, can shift in an axially free manner.

In that region which projects through the brake housing 16, there is fixedly arranged on the threaded spindle 9 a toothed bushing 30, which, on its outer circumferential shell surface, is provided with an axially extending outer serration 31.

The brake disk 27 has a coaxial through opening, which is provided with an inner serration which corresponds to the outer serration and in which the outer serration of the toothed bushing 30 engages such that the brake disk 27 is connected in a rotationally secure manner to the threaded spindle 9, yet can shift in an axially free manner on the toothed bushing 30.

As a result of the pretensioning of the compression spring arrangement 25, the first thrust washer 26 is pressed against the brake disk 27, and the brake disk 27 is pressed against the second thrust washer 28 axially supported against the latching hooks 20. Accordingly, when the threaded spindle 9 is rotationally driven by the drive motor 3, a specific braking torque has to be surmounted.

When the threaded spindle 9 is not driven by the drive motor 3, the threaded spindle is held by the braking torque in a rotationally secure manner in its current position.

REFERENCE SYMBOL LIST 1 drive housing
2 housing tube
3 drive motor
4 gear mechanism
5 coupling
6 bearing unit
7 friction brake arrangement
8 drive shaft
9 threaded spindle
10 end
11 elastomer ring
12 sleeve member
13 roller bearing
14 first back-up ring
15 second back-up ring
16 brake housing
17 ring
18 first stop shoulders
19 spring arms
20 latching hooks
21 guide bushing
22 clearances
23 anti-twist arms
24 recesses
25 compression spring arrangement
26 first thrust washer
27 brake disk
28 second thrust washer
29 protrusions
30 toothed bushing
31 outer serration
33 inner side
34 outer side

The invention claimed is:

1. A drive mechanism, comprising:
a housing tube;
a drive motor with drive shaft;
a threaded spindle rotatably drivable by the drive motor via the drive shaft, the drive motor and the threaded spindle being arranged coaxially in the housing tube;
a friction brake arrangement having a tubular brake housing axially and rotatably fixed in the housing tube, braking components, and a pretensioned spring, wherein the braking components and the pretensioned spring are arranged in the tubular brake housing, the braking components generating a braking force by the pretensioned spring that is surmounted by the drive motor to rotate the threaded spindle,
wherein the tubular brake housing has a first axial end and a second axial end, at least one radially inwardly directed first stop shoulder and a radially circumferential ring are arranged at the first axial end, at least one radially resilient spring arm extends from the circumferential ring axially toward the second axial end, and a respective second stop shoulder is arranged at each of the at least one spring arm.

2. The drive mechanism according to claim 1, wherein the at least one spring arm includes a plurality of spring arms distributed evenly in a circumferential direction on the periphery of the brake housing.

3. The drive mechanism according to claim 1, wherein the second stop shoulder is formed by an inner side of a latching hook extending radially and facing the first axial end of the brake housing, and an outer side of the latching hook faces the second axial end of the brake housing and is inclined from radially outer position to a radially inner position from the second axial end toward the first axial end.

4. The drive mechanism according to claim 1, wherein the braking components include a first thrust washer, a brake disk, and a second thrust washer, and the pretensioned spring is a pretensioned compression spring axially supported against the first stop shoulders, and axially supported against the second stop shoulder via the first thrust washer, the brake disk, and the second thrust washer, each of the first thrust washer and the second thrust washer being axially displaceable and connected in a rotationally secure manner to the brake housing and the brake disk is axially displaceable and fixed with respect to rotation to the threaded spindle.

5. The drive mechanism according to claim 1, further comprising a back-up ring arranged in an axially fixed manner in the housing tube, wherein the brake housing is directly or indirectly supported with its first end against the back-up ring.

6. The drive mechanism according to claim 1, further comprising a guide bushing arranged in an axially fixed manner in the housing tube, wherein the second end of the brake housing is axially supported against the guide bushing.

7. The drive mechanism according to claim 1, wherein the drive shaft is coupled to the threaded spindle via a flexible coupling.

8. The drive mechanism according to claim 7, wherein the threaded spindle is rotatably mounted by a roller bearing arranged between the brake housing and the flexible coupling.

9. The drive mechanism according to claim 1, wherein the brake housing consists of a plastic.

10. The drive mechanism of claim 1, wherein the at least one spring arm is prevented from deflecting radially by the housing tube.

* * * * *